United States Patent
Swallow

(10) Patent No.: US 10,119,445 B2
(45) Date of Patent: Nov. 6, 2018

(54) EXHAUST SYSTEM WITH A MODIFIED LEAN $NO_x$ TRAP

(71) Applicant: Johnson Matthey Public Limited Company, London (GB)

(72) Inventor: Daniel Swallow, Bedfordshire (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/487,195

(22) Filed: Sep. 16, 2014

(65) Prior Publication Data

US 2015/0075140 A1 Mar. 19, 2015

Related U.S. Application Data

(60) Provisional application No. 61/878,282, filed on Sep. 16, 2013.

(51) Int. Cl.
*F01N 3/00* (2006.01)
*F01N 3/20* (2006.01)
(Continued)

(52) U.S. Cl.
CPC ......... *F01N 3/208* (2013.01); *B01D 53/9418* (2013.01); *B01D 53/9481* (2013.01);
(Continued)

(58) Field of Classification Search
USPC .......... 60/274, 286, 295, 297, 301, 303; 422/169, 170, 171, 172, 177
See application file for complete search history.

(56) References Cited

U.S. PATENT DOCUMENTS

| 7,178,331 B2 * | 2/2007 | Blakeman | B01D 53/9431 422/170 |
| 8,105,559 B2 * | 1/2012 | Melville | B01D 53/9409 423/213.2 |

(Continued)

FOREIGN PATENT DOCUMENTS

| DE | 102008026191 A1 | 1/2009 |
| EP | 1027919 | 8/2000 |

(Continued)

OTHER PUBLICATIONS

Eastwood, Peter; Critical Topics in Exhaust Gas Aftertreatment; Research Studies Press Ltd, 2000, Baldock, Hertfordshire, England.

*Primary Examiner* — Binh Q Tran

(57) ABSTRACT

An exhaust system for treating an exhaust gas from an internal combustion engine is disclosed. The system comprises a modified lean $NO_x$ trap (LNT), a urea injection system, and an ammonia-selective catalytic reduction ($NH_3$-SCR) catalyst. The modified LNT comprises platinum, palladium, barium, and a ceria-containing material, and has a platinum:palladium molar ratio of at least 3:1. The modified LNT stores $NO_x$ at temperatures below about 200° C. and releases the stored $NO_x$ at temperatures above about 200° C. The urea injection system injects urea at temperatures above about 180° C.

9 Claims, 1 Drawing Sheet

(51) Int. Cl.
*F01N 3/08* (2006.01)
*F01N 3/035* (2006.01)
*F01N 13/00* (2010.01)
*B01D 53/94* (2006.01)

(52) U.S. Cl.
CPC ........... *F01N 3/035* (2013.01); *F01N 3/0807* (2013.01); *F01N 3/0842* (2013.01); *F01N 3/0885* (2013.01); *F01N 13/009* (2014.06); *B01D 53/9431* (2013.01); *B01D 2255/20707* (2013.01); *B01D 2255/20723* (2013.01); *B01D 2255/20738* (2013.01); *B01D 2255/20761* (2013.01); *B01D 2255/20776* (2013.01); *B01D 2255/502* (2013.01); *B01D 2255/504* (2013.01); *F01N 3/0814* (2013.01); *F01N 2370/02* (2013.01); *F01N 2430/085* (2013.01); *F01N 2510/06* (2013.01); *F01N 2610/02* (2013.01); *Y02A 50/2325* (2018.01); *Y02T 10/24* (2013.01)

(56) References Cited

U.S. PATENT DOCUMENTS

| | | | |
|---|---|---|---|
| 8,524,182 B2* | 9/2013 | Grubert | B01D 53/944 422/180 |
| 8,667,785 B2* | 3/2014 | Blakeman | B01J 35/0006 423/213.5 |
| 8,701,393 B2 | 4/2014 | Asanuma et al. | |
| 8,753,596 B2 | 6/2014 | Spurk et al. | |
| 9,034,286 B2* | 5/2015 | Bergeal | B01D 53/945 422/180 |
| 2007/0277513 A1* | 12/2007 | Yoshida | B01D 53/9422 60/299 |
| 2009/0301067 A1 | 12/2009 | Dingle et al. | |
| 2009/0320457 A1 | 12/2009 | Wan | |
| 2011/0005200 A1 | 1/2011 | Gandhi et al. | |
| 2011/0305615 A1 | 12/2011 | Hilgendorff et al. | |
| 2012/0055141 A1 | 3/2012 | Hilgendorff | |
| 2012/0214663 A1 | 8/2012 | Chigapov et al. | |

FOREIGN PATENT DOCUMENTS

| | | |
|---|---|---|
| EP | 2388449 A1 | 11/2011 |
| EP | 2995367 A1 | 3/2016 |
| JP | 2010043583 A | 2/2010 |
| JP | 2012184658 A | 9/2012 |
| JP | 2013146693 A | 8/2013 |
| KR | 20120042778 A | 5/2012 |
| WO | 2004076829 | 9/2004 |
| WO | 2006008625 A1 | 1/2006 |
| WO | 2008047170 | 4/2008 |
| WO | 2008103230 A1 | 8/2008 |
| WO | 2008106519 A1 | 9/2008 |
| WO | 2009118593 A1 | 10/2009 |
| WO | 2010114873 A2 | 10/2010 |
| WO | 2011154912 A1 | 12/2011 |
| WO | 2011154913 A1 | 12/2011 |

* cited by examiner

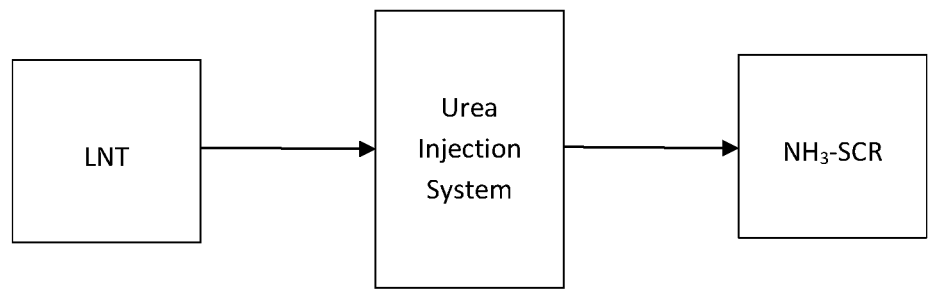

EXHAUST SYSTEM WITH A MODIFIED LEAN $NO_x$ TRAP

FIELD OF THE INVENTION

The invention relates to an exhaust system for treating an exhaust gas from an internal combustion engine, and a method for treating exhaust gas from internal combustion engines.

BACKGROUND OF THE INVENTION

Internal combustion engines produce exhaust gases containing a variety of pollutants, including nitrogen oxides ("$NO_x$"), carbon monoxide, and uncombusted hydrocarbons, which are the subject of governmental legislation. Emission control systems are widely utilized to reduce the amount of these pollutants emitted to atmosphere, and typically achieve very high efficiencies once they reach their operating temperature (typically, 200° C. and higher). However, these systems are relatively inefficient below their operating temperature (the "cold start" period).

For instance, current urea based selective catalytic reduction (SCR) applications implemented for meeting Euro 6b emissions require that the temperature at the urea dosing position be above about 180° C. before urea can be dosed and used to convert $NO_x$. $NO_x$ conversion below 180° C. is difficult to address using the current systems, and future European and US legislation will stress the low temperature $NO_x$ storage and conversion. Currently this is achieved by heating strategies but this has a detrimental effect of $CO_2$ emissions.

As even more stringent national and regional legislation lowers the amount of pollutants that can be emitted from diesel or gasoline engines, reducing emissions during the cold start period is becoming a major challenge. Thus, methods for reducing the level of $NO_x$ emitted during cold start condition continue to be explored.

For instance, PCT Intl. Appl. WO 2008/047170 discloses a system wherein $NO_x$ from a lean exhaust gas is adsorbed at temperatures below 200° C. and is subsequently thermally desorbed above 200° C. The $NO_x$ adsorbent is taught to consist of palladium and a cerium oxide or a mixed oxide or composite oxide containing cerium and at least one other transition metal.

U.S. Appl. Pub. No. 2011/0005200 teaches a catalyst system that simultaneously removes ammonia and enhances net $NO_x$ conversion by placing an ammonia-selective catalytic reduction ("$NH_3$-SCR") catalyst formulation downstream of a lean $NO_x$ trap. The $NH_3$-SCR catalyst is taught to adsorb the ammonia that is generated during the rich pulses in the lean $NO_x$ trap. The stored ammonia then reacts with the $NO_x$ emitted from the upstream lean $NO_x$ trap, which increases $NO_x$ conversion rate while depleting the stored ammonia.

PCT Intl. Appl. WO 2004/076829 discloses an exhaust-gas purification system which includes a $NO_x$ storage catalyst arranged upstream of an SCR catalyst. The $NO_x$ storage catalyst includes at least one alkali, alkaline earth, or rare earth metal which is coated or activated with at least one platinum group metal (Pt, Pd, Rh, or Ir). A particularly preferred $NO_x$ storage catalyst is taught to include cerium oxide coated with platinum and additionally platinum as an oxidizing catalyst on a support based on aluminum oxide. EP 1027919 discloses a $NO_x$ adsorbent material that comprises a porous support material, such as alumina, zeolite, zirconia, titania, and/or lanthana, and at least 0.1 wt % precious metal (Pt, Pd, and/or Rh). Platinum carried on alumina is exemplified.

As with any automotive system and process, it is desirable to attain still further improvements in exhaust gas treatment systems, particularly under cold start conditions. We have discovered a system that can reduce $NO_x$ emissions during the cold start period, while maintaining good CO oxidation activity and showing resistance to deactivation by sulfation.

SUMMARY OF THE INVENTION

The invention is an exhaust system for treating an exhaust gas from an internal combustion engine. The system comprises a modified lean $NO_x$ trap (LNT), a urea injection system, and an ammonia-selective catalytic reduction ($NH_3$-SCR) catalyst. The modified LNT comprises platinum, palladium, barium, and a ceria-containing material, and has a platinum:palladium molar ratio of at least 3:1. The modified LNT stores $NO_x$ at temperatures below about 200° C. and releases the stored $NO_x$ at temperatures above about 200° C.

BREIF DESCRIPTION OF THE DRAWINGS

FIG. 1 shows an embodiment of the invention.

DETAILED DESCRIPTION OF THE INVENTION

The invention is an exhaust system for treating an exhaust gas from an internal combustion engine. The system comprises a modified lean $NO_x$ trap (LNT). Lean $NO_x$ traps are well known in the art. Lean $NO_x$ trap are typically designed to adsorb $NO_x$ under lean exhaust conditions, release the adsorbed $NO_x$ under rich conditions, and reduce the released $NO_x$ to form $N_2$.

LNTs typically include a $NO_x$-storage component, an oxidation component, and a reduction component. The $NO_x$-storage component preferably comprises alkaline earth metals (such as barium, calcium, strontium, and magnesium), alkali metals (such as potassium, sodium, lithium, and cesium), rare earth metals (such as lanthanum, yttrium, praseodymium and neodymium), or combinations thereof. These metals are typically found in the form of oxides. Typically, platinum is included to perform the oxidation function and rhodium is included to perform the reduction function. These components are contained on one or more supports.

The oxidation/reduction catalyst and the $NO_x$-storage component are preferably loaded on a support material such as an inorganic oxide to form an LNT for use in the exhaust system.

The modified LNT of the invention is designed to have a different function than known LNTs, in that they are designed to store $NO_x$ at temperatures below about 200° C. and release the stored $NO_x$ at temperatures above about 200° C. The modified LNT comprises platinum, palladium, barium, and a ceria-containing material. The ceria-containing material is preferably ceria, ceria-zirconia, ceria-zirconia-alumina, or mixtures thereof. More preferably, the ceria-containing material is ceria.

The modified LNT has a platinum:palladium molar ratio of at least 3:1, more preferably greater than 4:1.

The modified LNT also comprises barium. The barium may be added to the modified LNT by any known means. For instance, a barium compound may be loaded onto the ceria-containing material or the support material by any known means, the manner of addition is not considered to be particularly critical. For example, a barium compound (such as barium acetate) may be added to the ceria-containing material or the support material by impregnation, adsorption, ion-exchange, incipient wetness, precipitation, or the like. Preferably, the modified LNT comprises at least 150 g/ft$^3$ loading of barium, and in some instances the modified LNT may comprise at least 400 g/ft$^3$ loading of barium.

Preferably, the modified LNT also comprises a support. The support is preferably an inorganic oxide, and more preferably includes oxides of Groups 2, 3, 4, 5, 13 and 14 elements. Most preferably, the support is an alumina, silica, titania, zirconia, magnesia, niobia, tantalum oxide, molybdenum oxide, tungsten oxide, a mixed oxide or composite oxide of any two or more thereof (e.g. silica-alumina, magnesia-alumina), and mixtures thereof. The support may also preferably contain cerium. Useful supports preferably have surface areas in the range 10 to 1500 m$^2$/g, pore volumes in the range 0.1 to 4 mL/g, and pore diameters from about 10 to 1000 Angstroms. High surface area supports having a surface area greater than 80 m$^2$/g are particularly preferred.

The modified LNT of the invention stores $NO_x$ at temperatures below about 200° C. and releases the stored $NO_x$ at temperatures above about 200° C.

The modified LNT is preferably coated on a substrate. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

The metallic substrate may be made of any suitable metal, and in particular heat-resistant metals and metal alloys such as titanium and stainless steel as well as ferritic alloys containing iron, nickel, chromium, and/or aluminum in addition to other trace metals.

The substrate may be a filter substrate or a flow-through substrate, and is most preferably a flow-through substrate, especially a honeycomb monolith. The substrate is typically designed to provide a number of channels through which vehicle exhaust passes. The surface of the channels is loaded with the three-way catalyst.

The modified LNT may be added to the substrate by any known means. For example, the modified LNT material may preferably applied and bonded to the substrate as a washcoat, a porous, high surface area layer bonded to the surface of the substrate. The washcoat is typically applied to the substrate from a water-based slurry, then dried and calcined at high temperature. Preferably, the modified LNT is added to the substrate as a single layer, although additional layers may be used.

The exhaust system of the invention also comprises an ammonia-selective catalytic reduction (NH$_3$-SCR) catalyst. The NH$_3$-SCR catalyst may comprise any known NH$_3$-SCR catalysts, which are well-known in the art. A NH$_3$-SCR catalyst is a catalyst that reduces $NO_x$ to $N_2$ by reaction with nitrogen compounds (such as ammonia or urea).

Preferably, the NH$_3$-SCR catalyst is comprised of a vanadia-titania catalyst, a vanadia-tungsta-titania catalyst, or a metal/zeolite. The metal/zeolite catalyst comprises a metal and a zeolite. Preferred metals include iron and copper. The zeolite is preferably a beta zeolite, a faujasite (such as an X-zeolite or a Y-zeolite, including NaY and USY), an L-zeolite, a ZSM zeolite (e.g., ZSM-5, ZSM-48), an SSZ-zeolite (e.g., SSZ-13, SSZ-41, SSZ-33), a ferrierite, a mordenite, a chabazite, an offretite, an erionite, a clinoptilolite, a silicalite, an aluminum phosphate zeolite (including metalloaluminophosphates such as SAPO-34), a mesoporous zeolite (e.g., MCM-41, MCM-49, SBA-15), or mixtures thereof; more preferably, the zeolite is a beta zeolite, a ferrierite, or a chabazite.

The NH$_3$-SCR catalyst is preferably coated on a ceramic or a metallic substrate, as described above. The substrate is typically designed to provide a number of channels through which vehicle exhaust passes, and the surface of the channels will be preferably be coated with the NH$_3$-SCR catalyst.

The substrate for the NH$_3$-SCR catalyst may be a filter substrate or a flow-through substrate. Preferably, the NH$_3$-SCR catalyst is coated onto a filter, which is known as an ammonia-selective catalytic reduction filter (NH$_3$-SCRF). SCRFs are single-substrate devices that combine the functionality of an NH$_3$-SCR and particulate filter. They are used to reduce $NO_x$ and particulate emissions from internal combustion engines.

The system of the invention further comprises a urea injection system. The urea injection system preferably comprises a urea injector that injects urea into the exhaust gas stream upstream of the NH$_3$-SCR catalyst and downstream of the modified LNT. The urea injection system will preferably consist of a nozzle to produce well defined droplets of urea solution. The droplet size is preferably less than 500 microns to allow rapid evaporation and urea decomposition. The injector pressure and pump rate will be such to allow effective mixing in the exhaust gas stream.

The urea injection system will also preferably consist of a urea tank, transfer lines and possibly a heating system to avoid freezing of the urea solution.

Preferably, the urea injection system injects urea at temperatures above about 180° C.

The invention also includes a method for treating an exhaust gas from an internal combustion engine. The method comprises passing the exhaust gas over the modified LNT described above. The modified LNT removes oxides of nitrogen ($NO_x$) from the exhaust gas at temperatures below about 200° C., and releases the $NO_x$ at temperatures above about 200° C. At temperatures above about 180° C., urea is injected into the exhaust gas downstream of the modified LNT, and the exhaust gas containing released $NO_x$ from the modified LNT and urea is passed over a NH$_3$-SCR catalyst. The released $NO_x$ is converted to nitrogen by the reaction of ammonia (generated from urea) with $NO_x$ over the NH$_3$-SCR catalyst. The released $NO_x$ is the $NO_x$ that is stored on the modified LNT at low temperatures and is then released at the higher temperatures, and also includes $NO_x$ that is passes over the NH$_3$-SCR NH$_3$-SCR catalyst without being stored.

Preferably, the modified LNT is periodically subjected to a rich desulfation step. The presence of sulfur compounds in fuel may be detrimental to the modified LNT since the oxidation of sulfur compounds leads to sulfur oxides in the exhaust gas. In the LNT, sulfur dioxide can be oxidized to sulfur trioxide over the platinum group metals and form surface sulfates on the LNT surface (e.g., barium oxide or barium carbonate reacts with sulfur trioxide to form barium sulfate). These sulfates are more stable than the nitrates and require higher temperatures (>500° C.) to desulfate.

In rich desulfation, the modified LNT is typically subjected to a temperature above about 500° C. in rich air:fuel ratio environment to accomplish sulfur removal. The desulfation is preferably performed by increasing exhaust temperatures through a post-injection of fuel. Desulfation strategies may include a single, continuous rich period, or a series of short rich air-to-fuel ratio pulses.

The following examples merely illustrate the invention. Those skilled in the art will recognize many variations that are within the spirit of the invention and scope of the claims.

EXAMPLE 1

Preparation of Modified LNTs

Modified LNT 1A (Pt:Pd ratio=5:1):
A 400 cells per square inch (cpsi) flow-through cordierite substrate monolith is coated with a $NO_x$ absorber catalyst formulation comprising a single layer comprising 1.5 $g/in^3$ Ce/magnesium-aluminate spinel, 3 $g/in^3$ particulate ceria, 94 $g/ft^3$ Pt, and 19 $g/ft^3$ Pd. The washcoat is coated on the virgin substrate monolith using the method disclosed in WO 99/47260, followed by drying for 30 minutes in a forced air drier at 100° C. and then firing at 500° C. for 2 hours.

Comparative LNT 1B: (Pt:Pd ratio=2:1)
Comparative LNT 1B is prepared according to the procedure for Modified LNT 1A, with the exception that the $NO_x$ absorber catalyst formulation comprising a single layer contains 53.3 $g/ft^3$ Pt, and 26.6 $g/ft^3$ Pd.

EXAMPLE 2

$NO_x$ Storage Testing

LNT 1A (1.6 L catalyst volume) is hydrothermally aged at 800° C. for 5 hours, and is then tested over the NEDC drive cycles on a 1.6 liter engine employing low pressure exhaust gas recirculation (EGR). No rich purging is employed during the testing.

The results show that the modified LNT 1A stores about 0.5 g $NO_x$ up to about 200° C., followed by near complete thermal release of the stored $NO_x$ from 200 to 300° C., showing that the modified LNT of the invention are capable of use with a $NH_3$-SCR system.

EXAMPLE 3

Desulfation Testing

LNT 1A and Comparative LNT 1B are subjected to a rich desulfation regeneration to test the effect on CO conversions. Comparative LNT 1B (1.6 liter catalyst volume), hydrothermally aged at 800° C. for 5 hours, is tested over repeated lean NEDC drive cycles on a 1.6 liter engine employing low pressure exhaust gas recirculation (EGR). Repeated lean NEDC cycles are completed to assess the deterioration in cycle CO conversion with extended lean operation. The results are shown in Table 1. Over the course of ten NEDC cycles, the tailpipe CO emission increase from 1.3 g CO to 4.7 g CO. Following the tenth lean cycle, a series of three NEDC cycles with a 3-second rich purge on the 100 kph cruise are performed to reactivate the catalyst. Analysis shows that one 3-second rich purge is sufficient to re-activate the catalyst, as the tailpipe CO emission is reduced to 1.8 g CO. A further 10 lean only NEDC cycles are completed to follow the CO deactivation again, and on the tenth cycle the tailpipe CO emission increases to 5.6 g CO. Following the second NEDC cycle, a 500-550° C. inlet temperature desulfation is performed for 10 minutes at lambda 0.95, and a third 10-cycle NEDC testing is performed. The results show that high temperature desulfation deactivates that LNT toward CO conversion. Following the third NEDC cycle, a 10 minute lean DPF regeneration (600° C. in an oxygen-containing atmosphere) is completed. Results show that the original CO conversion is not recovered upon this regeneration.

In contrast, modified LNT 1A of the invention shows good CO conversion following rich desulfation, where comparison LNT 1B loses CO conversion following rich desulfation.

TABLE 1

| Tailpipe CO emissions | | |
| --- | --- | --- |
| | CO tailpipe emissions (g) | |
| Test Run | $1^{st}$ cycle | $10^{th}$ cycle |
| NEDC # 1 | 1.3 | 4.7 |
| NEDC # 2- after rich purge | 1.8 | 5.6 |
| NEDC # 3- after high temperature desulfation | 5.0 | 6.2 |
| NEDC # 4- after hot lean regeneration | 4.4 | — |

I claim:

1. An exhaust system for treating an exhaust gas from an internal combustion engine, comprising:
   (a) NOx treatment catalysts, and
   (b) a urea injection system;
   wherein the NOx treatment catalysts consist essentially of a single layer lean $NO_x$ trap (LNT), comprising platinum, palladium, barium, and a ceria-containing material and a platinum:palladium molar ratio of at least 3:1; and an ammonia-selective catalytic reduction ($NH_3$-SCR) catalyst;
   wherein the urea injection system is upstream of the $NH_3$-SCR catalyst and downstream of the LNT; and
   wherein the LNT stores $NO_x$ at temperatures below about 200° C. and releases the stored $NO_x$ at temperatures above about 200° C.

2. The exhaust system of claim 1 wherein the urea injection system injects urea at temperatures above about 180° C.

3. The exhaust system of claim 1 wherein the LNT has a platinum:palladium molar ratio of at least 4:1.

4. The exhaust system of claim 1 wherein the LNT has a barium loading of greater than 150 $g/ft^3$.

5. The exhaust system of claim 1 wherein the LNT has a barium loading of greater than 400 $g/ft^3$.

6. The exhaust system of claim 1 wherein the $NH_3$-SCR catalyst is selected from the group consisting of a vanadia-titania catalyst, a vanadia-tungsta-titania catalyst, and a metal/zeolite.

7. The exhaust system of claim 6 wherein the metal/zeolite comprises a metal selected from the group consisting of iron or copper and a zeolite selected from the group consisting of a beta zeolite, a faujasite, an L-zeolite, a ZSM zeolite, an SSZ-zeolite, a ferrierite, a mordenite, a chabazite, an offretite, an erionite, a clinoptilolite, a silicalite, an aluminum phosphate zeolite, and a mesoporous zeolite.

8. The exhaust system of claim 1 wherein the $NH_3$-SCR catalyst is an ammonia-selective catalytic reduction filter ($NH_3$-SCRF).

9. The exhaust system of claim 8 wherein the $NH_3$-SCRF comprises a filter having a $NH_3$-SCR catalyst selected from the group consisting of a vanadia-titania catalyst, a vanadia-tungsta-titania catalyst, and a metal/zeolite.

\* \* \* \* \*